Dec. 22, 1953
C. H. LAEMMEL
2,663,033
AUTOMATIC PULL-OFF OR YOKE OPERATED DIE HEAD
Filed Dec. 22, 1948
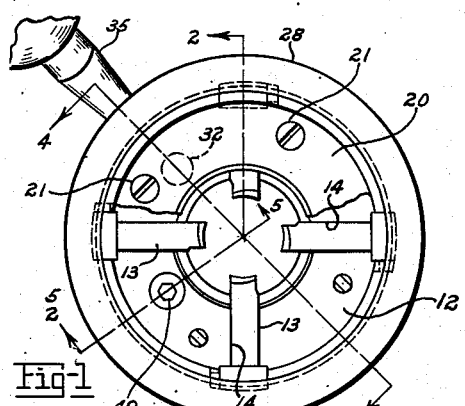
Fig-1
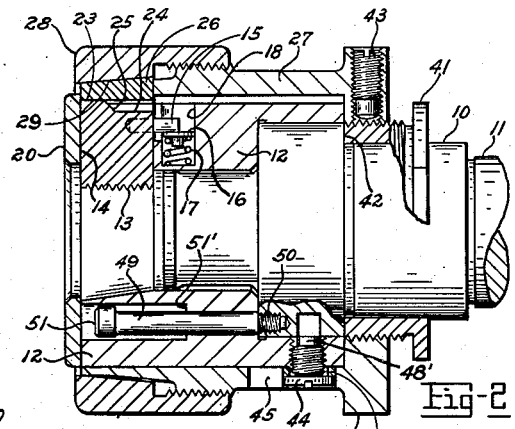
Fig-2
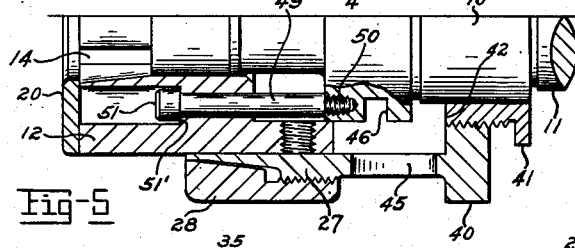
Fig-5
Fig-8
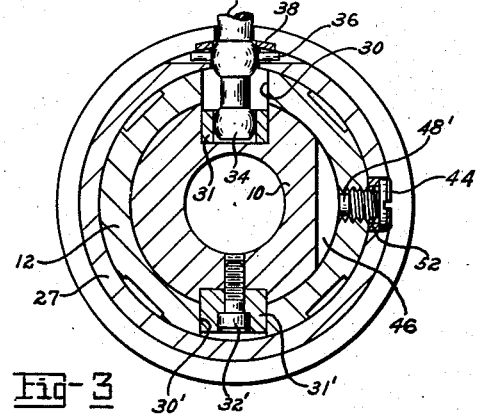
Fig-3
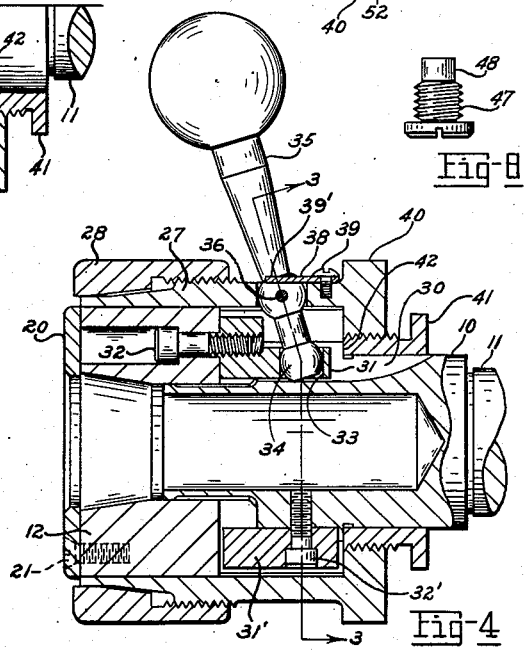
Fig-4
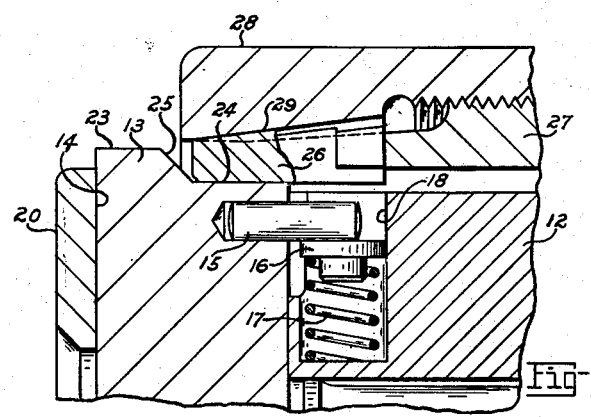
Fig-6
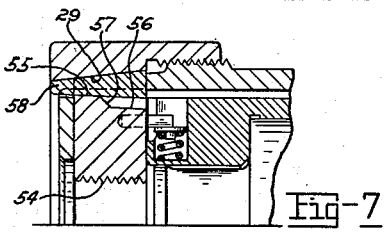
Fig-7
INVENTOR.
Charles H. Laemmel
BY
Edward T. Noig
atty.

Patented Dec. 22, 1953

2,663,033

UNITED STATES PATENT OFFICE 2,663,033

AUTOMATIC PULL-OFF OR YOKE OPERATED DIE HEAD

Charles H. Laemmel, Dayton, Ohio, assignor, by mesne assignments, to The Sheffield Corporation, Dayton, Ohio, a corporation of Ohio Application December 22, 1948, Serial No. 66,793

8 Claims. (Cl. 10—95)

This invention relates to die heads having a series of cutting dies for forming or threading operations on the work.

One object of the invention is the provision of a die head having a lever for closing the dies and also having a yoke operated ring for closing the dies, the die head being constructed and arranged so it may be readily converted from a pull-off type of operation to a yoke operated trip type of operation.

Another object resides in the provision of a die head embodying a shank, a chaser-carrying body on the shank and an operating shell that moves the chasers inwardly under the control either of a lever or a yoke operated member controlled by means of an operating yoke or the like.

Another object is the provision of a die head of the character mentioned in which the die carrying body may be fastened to the shank to convert the die head from one of the pull-off type to one of the yoke operated trip type.

Other objects and advantages of the invention will be apparent from the following description, the appended claims, and the accompanying drawing, in which Fig. 1 is an end view of a die head embodying the present invention;

Fig. 2 is a section taken on the line 2—2 of Fig. 1;

Fig. 3 is a transverse sectional view taken on the line 3—3 of Fig. 4;

Fig. 4 is a longitudinal section on the line 4—4 of Fig. 1;

Fig. 5 is a part sectional view corresponding to Fig. 2 but showing the die head fully opened for withdrawal of the chasers;

Fig. 6 is an enlarged sectional detail corresponding to Fig. 3 but showing the die head in open or tripped position;

Fig. 7 is a sectional view showing a modified form of camming means adapted for cutting tapered threads; and Fig. 8 is a detail view of a modified form of holding screw for fastening the chaser-carrying body to the shank.

Referring more particularly to the drawing in which the same reference numerals have been used in the several views to designate like parts, 10 designates the shank portion of a die head, the shank terminating in an extension 11 which may be mounted in a suitable driving head of either the rotating or non-rotating type. Slidably mounted on the shank is a body 12 which carries a series of dies or chasing cutters 13. In the form of the invention illustrated these cutters are threading chasers 13 mounted in radial slots 14 in the body 12 in which they can move inwardly to closed position or outwardly to open position. Each chaser is provided with a projection or pin 15 engaged by a pressure disc 16 urged outwardly by a coil spring 17. The springs and the pressure discs are provided in recesses 18 in the body 12.

The forward end of the body 12 and the forward sides of the chasers are covered or protected by cap plate 20 held in place by screws 21 which engage internal threads in the body 12.

Each chaser at its outer end is provided with offset surfaces 23 and 24 and an inclined surface 25 extending between the offset surfaces. These surfaces are engaged by a cam 26 keyed to an operating shell 27 so that the cams move inwardly or outwardly with respect to that shell. The key connection is such that it must travel with the shell in a direction axially of the head. The shell 27 includes a size adjusting ring 28 having a conical camming surface 29 engaging the outer sides of the several cams 26 which are interposed between the adjusting ring 28 and the outer ends of the chasers. It will be understood that when the shell is in the position shown in Fig. 2, the cams 26 engage the surfaces 23 of the chasers and hold them in their set or closed positions but when the shell is retracted until the ends of the cams begin to engage the surfaces 25, the springs 17 act to force the chasers outwardly to open or tripped position as shown in Fig. 6, pushing the operating shell rearwardly until the surfaces 24 of the chasers engage the cams 26. The chasers are thus tripped as soon as the surfaces 25 engage the ends of cams 26.

The body member 12 is held against rotation with respect to the shank 10. For this purpose the shank is grooved as indicated at 30, see Fig. 4. In the groove is a slide block 31 capable of axial movement and fastened by means of a screw 32 to the body 12 so that the shank and the body member 12 must rotate together. Opposite the block 31 is a drive block 31' held by screw 32' in a groove 30' in the shank with the block engaging the sides of a groove in the body 12 as shown in Fig. 3. The slide block 31 has a passage 33 cooperating with the spherical end 34 of an operating lever 35 pivotably mounted as by means of trunnions 36 on the operating shell 27, the trunnions 36 projecting transversely of the operating lever and seating in grooves or recesses in the outer surface of the shell. The trunnions are retained in these grooves by holding plate 38 secured to the operating shell by means of an attaching screw 39 and having a bifurcated retaining portion 39' overlying the trunnions 36. The screw 39 is freely accessible from the exterior of the head so it can be readily removed permitting removal of the retaining plate 38, and when that plate is removed the lever 35 can be removed entirely from the head without disassembly of the head. When used as a pull-off die head however, the lever 35 remains in its operative position as shown in Fig. 4 so that the operator can close the chasers by swinging the lever to the left as shown in Fig. 4, holding the chasers inwardly in operative thread chasing position.

Having closed the chasers, a threading operation on the workpiece takes place during the rotation of the workpiece, and this threading operation continues until relative axial advance of the chasers and the work is stopped, as by stopping the forward travel of the head on which the die head is mounted. The continued rotation of the workpiece then draws the chasers, the body 12, and the slide block 31 forwardly until the ends of the cams 26 reach the surfaces 25 of the chasers and the chasers are tripped. This pull-off trip operation is thus produced by the threading operation itself which pulls the chaser-carrying body axially with respect to the die head shank until the tripping action results.

The rear portion of the operating shell is shaped to provide an opening ring 40 adapted for yoke operation. This ring has an adjustable threaded connection to a shell adjusting nut 41 slidable on the shank 10 and engageable against a stop surface 42 on the shank to determine the extent of the forward travel of the operating shell. Set screw 43 holds the relative setting of the ring 40 with respect to nut 41. By adjusting the nut the length of thread produced during the pull-off action of the chasers can be set. If the nut 41 is turned until its shoulder engages the ring 40, the ends of the cams 26 are comparatively close to the inclined surfaces 25 of the chasers before the pull-off operation starts. During its normal operation as a pull-off die head, the yoke is not employed for the control of the opening ring 40 and under such conditions the body 12 can move axially of the shank in a direction towards the left as viewed in Fig. 2 for pull-off operation as previously described. Also under these conditions a stop screw 44 having a dog 44' is threaded in the body 12 and the head of this screw operates in a slot 45 in the shell 27 to limit the travel of the shell on the body in a direction axially of the die head. When the head is to be adapted for yoke control instead of pull-off trip operation, however, a washer 52 that is normally employed under the head of the screw is removed and the screw is threaded inwardly and enters a groove 46 in the shank 10 so as to secure the body and the shank together against relative axial movement. When adapted for pull-off operation the cylindrical end of the stop screw 44 is held out of the groove 46 because of the washer 52. Instead of removing the washer 52, the screw and the washer 52 may both be replaced by a retaining screw 47, illustrated in Fig. 8. Screw 47 has an entering end 48 which is longer than the end of screw 44 to enter more deeply into the recess in the shank. Under such conditions the shank and the body cannot move relatively, and under such conditions the ring 40 is controlled by an operating yoke which is moved at the proper time to retract the shell 27 and thus release or trip the chasers. The yoke is also effective to close the die head at the start of a threading operation.

It should also be noted that when the die head is arranged for yoke operation and employed in a rotating driving head, it is preferred that the handle 35 be entirely removed after first taking off the retainer 38 as in the manner previously described.

Fig. 5 shows the position that the parts assume when removal of the chasers is to be effected. The screw 44 is first removed so that it no longer stops the axial travel of the operating shell with respect to the body 12. The shell may then be moved rearwardly or to the right as viewed in Fig. 2 until the outer ends of the chasers are entirely uncovered and they may then be withdrawn readily for sharpening or replacement. The complete separation of the shell from the body under these conditions is prevented by means of a stop screw 49 freely slidable in the body and having a threaded end 50 threaded in the shank. It has a length such that the head 51 of the bolt screws against a stop shoulder 51' on the body 12 before the body rides off the end of the shank.

In the form of construction illustrated in Figs. 1 to 5 the surfaces 23 and 24 are parallel to the axis of the die head for cutting straight threads. However, for cutting tapered threads by a receding or advancing movement of the chasers during threading, the ends of the chasers or cutters may be provided with inclined surfaces cooperating with similarly inclined surfaces on the actuating cams. Thus as shown in Fig. 7, the cutters 54 may have surfaces 55 and 56 connected by inclined trip surfaces 57. The cams 58 have camming engagement with the conical surface 29 of the adjusting ring on the shell as in the construction shown in Figs. 1 to 5 but the cams may be longer and have inclined inner sides as shown in Fig. 7 so that the chasers are moved radially during the pull-off operation or during the time the shell is being retracted on the body by means of the yoke controlled ring 40.

It will now be apparent that in accordance with the invention a die head of simple construction has been provided which is capable of adaptation for either yoke operation or for automatic pull-off trip operation as desired. The modification required to change the die head from one type to the other is very simple and may be accomplished without disassembly of the operating parts of the die head. A device of this sort thus satisfies the different requirements of different customers and the different requirements of any customer for different uses. Thus the die head may be provided with threading chasers and used as a pull-off die head, and merely by removing the handle and fastening the body member to the shank portion of the die head by engaging the screw 44 or screw 47 in the recess 46, it may be adapted for use either in a threading or a forming operation in which the cutting dies may be opened and closed by a control yoke engaging the ring 40 of the die head at the proper times in the sequence of operation.

While the form of apparatus herein described constitutes a preferred embodiment of the invention it is to be understood that the invention is not limited to this precise form of apparatus, and that changes may be made therein without departing from the scope of the invention which is defined in the appended claims.

What is claimed is:

1. A die head adapted for either pull-off operation or yoke operation as desired, said head having threading chasers, a shank, and a carrying body on said shank on which the chasers are movable from opened to closed positions, an opening and closing shell having an operable connection with the chasers, manually operable means for moving the chasers to closed position, means for opening the chasers automatically in a threading operation when the shank is held against axial travel with respect to the work, securing means for preventing movement of the body with respect to the shank during yoke operation, and an opening ring on the opening and closing shell adapted for yoke operation to open the chasers and to close the chasers.

2. A die head having threading chasers, a shank, and a carrying body on said shank on which the chasers are movable from opened to closed positions, a lever projecting outwardly from the die head for moving the chasers to closed position, said body having a support on said shank providing normally for axial movement of the body on the shank, means for preventing relative rotation of the body on the shank, means for opening the chasers automatically in a threading operation when the shank is held against axial travel with respect to the work, means for disabling said last named means, an operating shell carried for axial movement by said body and an opening ring movable with the shell and adapted for yoke operation to open the chasers and to close the chasers.

3. A die head having a shank, a chaser carrying body carried by said shank on which chasers are movable from opened to closed positions, said body normally having freedom of movement axially of the shank, an operating shell for moving the chasers inwardly and having means for automatically tripping the chasers for outward movement thereof when a predetermined axial travel of the body on the shank takes place, a manually operable lever inter-connecting said body and said shell and adapted for manual operation to close the chasers, means for securing said body to said shank and an opening ring movable with said shell and adapted for yoke operation when the body is secured to the shank to open the chasers and to close the chasers.

4. A die head having a shank, a chaser carrying body adapted for axial movement on the shank, an operating shell shiftable on the body for moving the chasers inwardly, means for moving the chasers outwardly, a lever for moving the shell on the body, securing means for maintaining said lever in operable position and readily accessible from the exterior of the die head to permit removal of the lever, said shell having a ring portion adapted for yoke operation, and means for fastening the shank to the body.

5. A die head adapted for either automatic pull-off trip operation or for positive trip operation as by means of an operating yoke or the like, comprising a shank, a chaser-carrying body mounted for normal axial movement with respect to the shank, an operating shell for moving the chasers inwardly and having means for tripping the chasers for opening movement when a predetermined axial travel of the body on the shank results from limiting the relative axial movement of the work and the shank, a lever for moving the shell on the body to close the chasers and operable in a reverse direction to open the chasers, means operable to provide for the removal of the lever while the die head remains otherwise assembled, to adapt the die head for yoke controlled tripping, an opening ring on the operating shell adapted for yoke operation and controlling said operating shell to open and to close the chasers, and means operable to positively prevent relative axial movement of the chaser-carrying body and the shank for disabling the automatic pull-off trip operation.

6. A die head adapted for either automatic pull-off trip operation or for positive trip operation as by means of an operating yoke or the like, comprising a shank, a chaser-carrying body mounted for normal axial movement with respect to the shank, an operating shell for moving the chasers inwardly, camming means operable by said shell for tripping the chasers for opening movement when a predetermined axial travel of the body on the shank results from limiting the relative axial movement of the work and the shank, a shell adjusting nut threaded to said shell engageable with a stop shoulder on the shank to adjustably position the shell with respect to the body for length of thread adjustment, a lever for moving the shell on the body to close the chasers, an opening ring fixed to the operating shell and adapted for yoke operation and moving said shell to open and close the chasers, and means operable to positively prevent relative axial movement of the chaser-carrying body and the shank for disabling the automatic pull off trip operation.

7. A die head having a shank, a chaser-carrying body having radial chaser receiving slots, said body being mounted for axial movement on the shank, an operating shell for moving the chasers inwardly, a lever projecting outwardly of the shell and pivotably mounted on the shell and having an inwardly extending portion engaging the body for shifting the shell on the body, securing means for maintaining said lever in operable position and readily removable without disassembly of the die head for removal of the lever, said shell having a ring adapted for yoke operation, means operable to fasten the shank to the body to adapt the die head for yoke operation.

8. A die head having a shank, a chaser-carrying body axially movable on said shank, radial chaser receiving slots in said body, an operating shell slidable on said body and having cam means for moving the chasers inwardly, a lever projecting outwardly of said shell for moving the shell on the body to close the chasers and to open the chasers, means operable to provide automatic pull off trip operation when the shank and the work are held against relative axial travel, means operable to provide for removal of the lever without disassembly of the die head, a ring adapted for yoke operation and movable with said shell to control the inward and outward movement of the chasers, said shell having an opening, means engageable through said opening from the exterior of the die head for positively fastening said body to said shank, said means when removed permitting retraction of the shell with respect to the body to such extent as to fully uncover the chaser holding slots in the body.

CHARLES H. LAEMMEL.

References Cited in the file of this patent

UNITED STATES PATENTS

| Number | Name | Date |
|---|---|---|
| 1,472,912 | Jobst | Nov. 6, 1923 |
| 1,474,179 | Smith et al. | Nov. 13, 1923 |
| 1,732,358 | Furlong et al. | Oct. 22, 1929 |
| 1,867,191 | Strickland | July 12, 1932 |